US008462251B2

(12) United States Patent
Shimano

(10) Patent No.: US 8,462,251 B2
(45) Date of Patent: Jun. 11, 2013

(54) SOLID-STATE IMAGE SENSOR DEVICE AND DIFFERENTIAL INTERFACE THEREOF

(75) Inventor: Hiroki Shimano, Tokyo (JP)

(73) Assignee: Renesas Technology Corp., Kanagawa (JP)

( * ) Notice: Subject to any disclaimer, the term of this patent is extended or adjusted under 35 U.S.C. 154(b) by 0 days.

(21) Appl. No.: 13/542,431

(22) Filed: Jul. 5, 2012

(65) Prior Publication Data

US 2013/0057336 A1 Mar. 7, 2013

Related U.S. Application Data

(63) Continuation of application No. 12/424,150, filed on Apr. 15, 2009, now Pat. No. 8,237,836.

(30) Foreign Application Priority Data

May 29, 2008 (JP) ................................ 2008-140422
Oct. 29, 2008 (JP) ................................ 2008-278189

(51) Int. Cl.
*H04N 5/335* (2011.01)

(52) U.S. Cl.
USPC ............................ 348/308; 257/355; 257/363

(58) Field of Classification Search
USPC .......... 348/294, 300, 308; 257/291, 337–339, 257/355–364; 327/333, 334, 336
See application file for complete search history.

(56) References Cited

U.S. PATENT DOCUMENTS

| 4,730,132 A | 3/1988 | Watanabe et al. |
| 4,984,202 A | 1/1991 | Kawahara et al. |
| 5,223,744 A | 6/1993 | Ohbayashi et al. |
| 6,452,632 B1 | 9/2002 | Umeda et al. |
| 6,515,271 B1 | 2/2003 | Shimizu |
| 7,119,782 B2 | 10/2006 | Sunohara et al. |
| 7,274,361 B2 | 9/2007 | Chang et al. |
| 8,169,499 B2 * | 5/2012 | Shimoda ..................... 348/222.1 |
| 2005/0062864 A1 | 3/2005 | Mabuchi |
| 2006/0262055 A1 | 11/2006 | Takahara |

FOREIGN PATENT DOCUMENTS

| JP | 04-051555 A | 2/1992 |
| JP | 10-074391 A | 3/1998 |
| JP | 10-293995 A | 11/1998 |

(Continued)

OTHER PUBLICATIONS

Yoshihara, S., et al., "A 1/1.8-inch 6.4 MPixel 60 frames/s CMOS Image Sensor With Seamless Mode Change", IEEE Journal of Solid-State Circuits, Dec. 2006, pp. 2998-3006, vol. 41 No. 12, IEEE.
National Semiconductor Corporation, "LVDS Owner's Manual Low-Voltage Differential Signaling", Spring 2004, 3rd Edition.

(Continued)

*Primary Examiner* — Huy K Mai
(74) *Attorney, Agent, or Firm* — McDermott Will & Emery LLP

(57) ABSTRACT

A solid-state image sensor device comprises an image sensor section for outputting analog signals of an image being taken; a plurality of AD converter sections, arranged with respect to the column direction of the image sensor section, for converting the analog signals into digital signals; a drive circuit section for controlling the image sensor section and the AD converter sections; and a plurality of differential interface sections for transmitting the digital signals converted by the AD converter sections as differential output signals to an external device. Each of the differential interface sections comprises a current value changeover circuit and offset voltage holding circuit operative when an operation mode changeover is made.

3 Claims, 13 Drawing Sheets

FOREIGN PATENT DOCUMENTS

| | | |
|---|---|---|
| JP | 2000-333081 | 11/2000 |
| JP | 2005-086224 | 3/2005 |
| JP | 2005-191800 A | 7/2005 |
| JP | 2007-102154 A | 4/2007 |
| JP | 2008-090315 A | 4/2008 |

OTHER PUBLICATIONS

Notification of Reasons for Refusal, and English translation thereof, issued in Japanese Patent Application No. 2008-278189 dated Oct. 23, 2012.

* cited by examiner

DIFFERENTIAL OUTPUT SIGNAL WAVEFORM

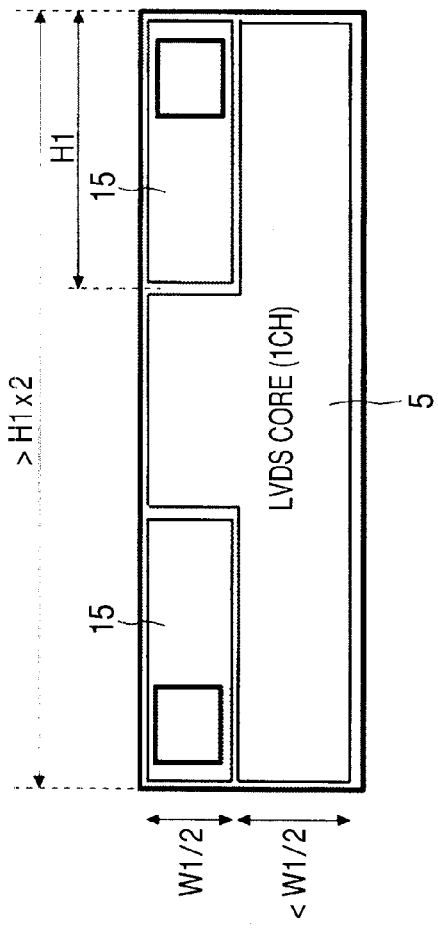
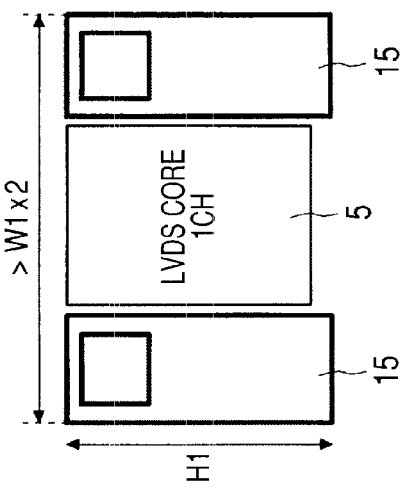
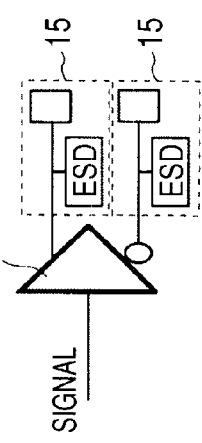
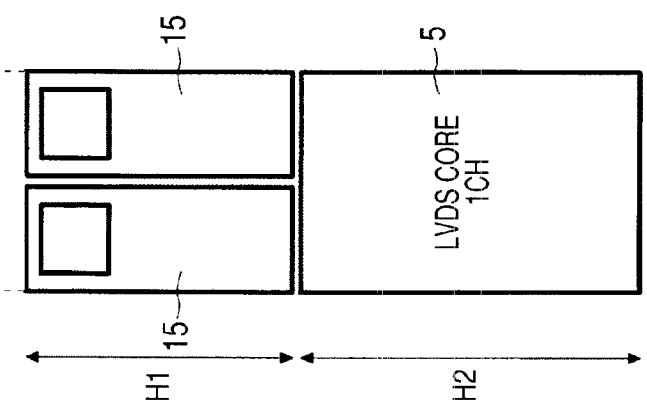

SOLID-STATE IMAGE SENSOR DEVICE AND DIFFERENTIAL INTERFACE THEREOF

CROSS-REFERENCE TO RELATED APPLICATIONS

This application is a Continuation of U.S. application Ser. No. 12/424,150, filed on Apr. 15, 2009 now U.S. Pat. No. 8,237,836, claiming priority of Japanese Patent Application Nos. 2008-278189, filed on Oct. 29, 2008 and 2008-140422, filed on May 29, 2008, the entire contents of each of which are hereby incorporated by reference.

BACKGROUND OF THE INVENTION

The present invention relates to a solid-state image sensor device and a differential interface thereof.

With significant advances in digital technology in recent years, digital cameras have become prevalent in place of conventional film cameras that had been in widespread use. Designed with remarkable improvements in image quality, most of the latest models of digital cameras are capable of providing image formation performance superior to that of conventional film cameras. For use in digital cameras, there are mainly two kinds of solid-state image sensor devices; CCD (Charge Coupled Device) image sensors, and CMOS (Complementary Metal Oxide Semiconductor) image sensors.

To achieve higher functionalities in digital cameras, particular attention has been given to CMOS image sensors. In particular, intensive research and development has been conducted on digital output types of CMOS image sensors capable of outputting massive image data at high speed. With the use of a digital-output CMOS image sensor allowing high-speed output of massive image data, a digital camera will be usable not only for movie recording but also for a variety of shooting applications in combination with image processing. For example, in recording a momentary scene of a tennis racket hitting a ball or a close-up picture of a child's face just in front of a finish-line tape in an athletic meet, it will become possible to let a digital camera equipped with a digital-output CMOS image sensor judge when to click a shutter thereof in an automatic mode just by orienting the digital camera in the shooting direction of interest.

In operation of a digital-output CMOS image sensor, it is required to transfer massive data of images being taken to an image processing circuit block at high speed. To meet this requirement, the digital-output CMOS image sensor employs a plurality of ADC circuits arrayed with respect to image sensor columns and a plurality of differential interface circuits featuring a small amplitude such as LVDS (Low Voltage Differential Signaling) interface circuits capable of outputting pixel data at a fast speed corresponding to a high frame rate of digital imaging. Concrete examples of digital-output CMOS image sensor configurations are found in the patent documents 1 and 2 and the non-patent document 1 indicated below.

As described in the non-patent document 2 indicated below, the LVDS interface used in the digital-output CMOS image sensor can realize high-speed data transfer on the order of at least hundreds of Mbps with low power consumption and low noise including low EMI (Electro-Magnetic Interference) owing to high performance of noise suppression to ensure high reliability of data transmission.

Patent Document 1:
Japanese Unexamined Patent Publication No. 2000-333081
Patent Document 2:
Japanese Unexamined Patent Publication No. 2005-86224
Non-patent document 1:
S. Yoshihara, et al, "A 1/1.8-inch 6.4M pixel. 60 Frames/s CMOS Image Sensor with Seamless Mode Change," IEEE JSSCC 41 (12), 2006
Non-patent document 2:
National Semiconductor Corporation, "LVDS Owner's Manual (3rd Edition), Chapter 1—Introduction to LVDS", [online], December 2004, Internet <URL:http://www.national.com/JPN/appinfo/lvds/files/lvds_ch 1.pdf>

SUMMARY OF THE INVENTION

In the use of a digital camera, it is not always required to perform a mode of operation in which pixel data is output at high speed. In such a case as a live view mode to be selected before a shutter of the digital camera is pressed, a low-speed image data output operation at a low frame rate may be performed. However, where a digital-output CMOS image sensor disclosed in the patent document 1 and elsewhere is used, the LVDS interface employed in the CMOS sensor feeds a constant output current to a differential pair transmission line, thereby not allowing an operation mode for outputting pixel data at low speed. This gives rise to a problem that power consumption cannot be reduced.

Further, in a conventional solid-state image sensor device, there is a problem that when an offset signal level for differential output signaling is varied at the time of operation mode changeover, stable transmission of image data to a receiver cannot be ensured.

It is therefore an object of the present invention to provide a solid-state image sensor device and a differential interface thereof that are capable of ensuring stable transmission of image data while reducing power consumption.

In accomplishing this object of the present invention and according to one aspect thereof, there is provided a solid-state image sensor device comprising an image sensor section for outputting analog signals of an image being taken; a plurality of AD converter sections, arranged with respect to the column direction of the image sensor section, for converting the analog signals into digital signals; a drive circuit section for controlling the image sensor section and the AD converter sections; and a plurality of differential interface sections for transmitting the digital signals converted by the AD converter sections as differential output signals to an external device. Further, in this arrangement according to the present invention, each of the differential interface sections comprises a current value changeover circuit for selecting a constant current to be applied in each differential interface section in accordance with each of a plurality of operation modes, and an offset voltage holding circuit for maintaining a constant offset voltage level for the differential output signals even when an operation mode changeover is made.

In the differential interface section of the solid-state image sensor device according to the present invention, the current value changeover circuit selects a constant current to be applied in the differential interface section in accordance with each of a plurality of operation modes, and the offset voltage holding circuit maintains a constant offset voltage level for the differential output signals even when an operation mode changeover is made. Therefore, the solid-state image sensor device according to the present invention is capable of transmitting image data with high stability while reducing power consumption.

BRIEF DESCRIPTION OF THE DRAWINGS

FIGS. 9(a) to 9(d) are explanatory diagrams showing layouts of an LVDS interface and I/O areas in a preferred embodiment 4 of the present invention;

DETAILED DESCRIPTION OF THE PREFERRED EMBODIMENTS

Preferred Embodiment 1

Figure 1:
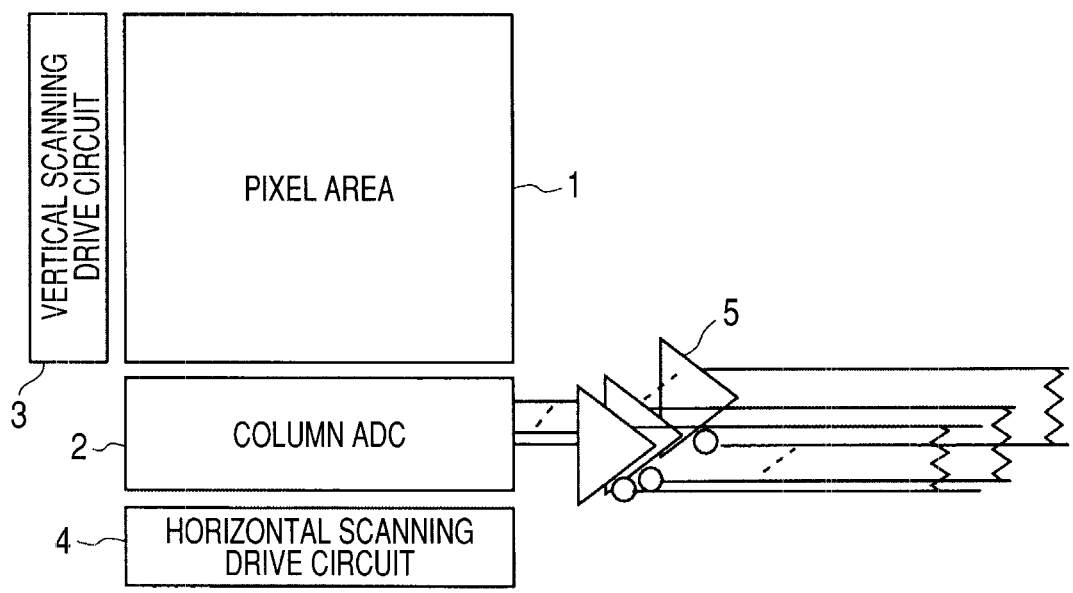
FIG. 1 is a block diagram showing a solid-state image sensor device in a preferred embodiment 1 of the present invention.

Referring to FIG. 1, there is shown a block diagram of a solid-state image sensor device according to a preferred embodiment 1 of the present invention. The solid-state image sensor device shown in FIG. 1 comprises a pixel area 1, a column ADC 2, a vertical scanning drive circuit 3, horizontal scanning drive circuit 4, and an LVDS interface 5. In the pixel area 1, there is provided a CMOS image sensing circuit comprising one polysilicon layer and three metallic layers to provide 2,870,000 basic pixels (1968×1460 pixels), for example. The column ADC 2 is an analog-to-digital converter circuit that receives analog signals of image data output from the CMOS image sensing circuit of the pixel area 1 and converts the analog signals into digital signals for image processing. Since the column ADC is provided for each column of the CMOS image sensing circuit, parallel processing can be performed for image data.

The vertical scanning drive circuit 3 and the horizontal scanning drive circuit 4 are used for controlling the pixel area 1 and the column ADC 2. The LVDS interface 5 transfers digital signals converted by the column ADC 2 to an external image processing circuit block (not shown). In the LVDS interface 5, a plurality of interface circuits are provided for respective bits of digital data output from the column ADC 2, for example, thereby making it possible to perform high-speed data output from the solid-state image sensor device. Further, in differential interfacing operation, the LVDS interface 5 can realize high-speed data transfer on the order of at least hundreds of Mbps with low power consumption and low EMI (low noise).

Figure 2:
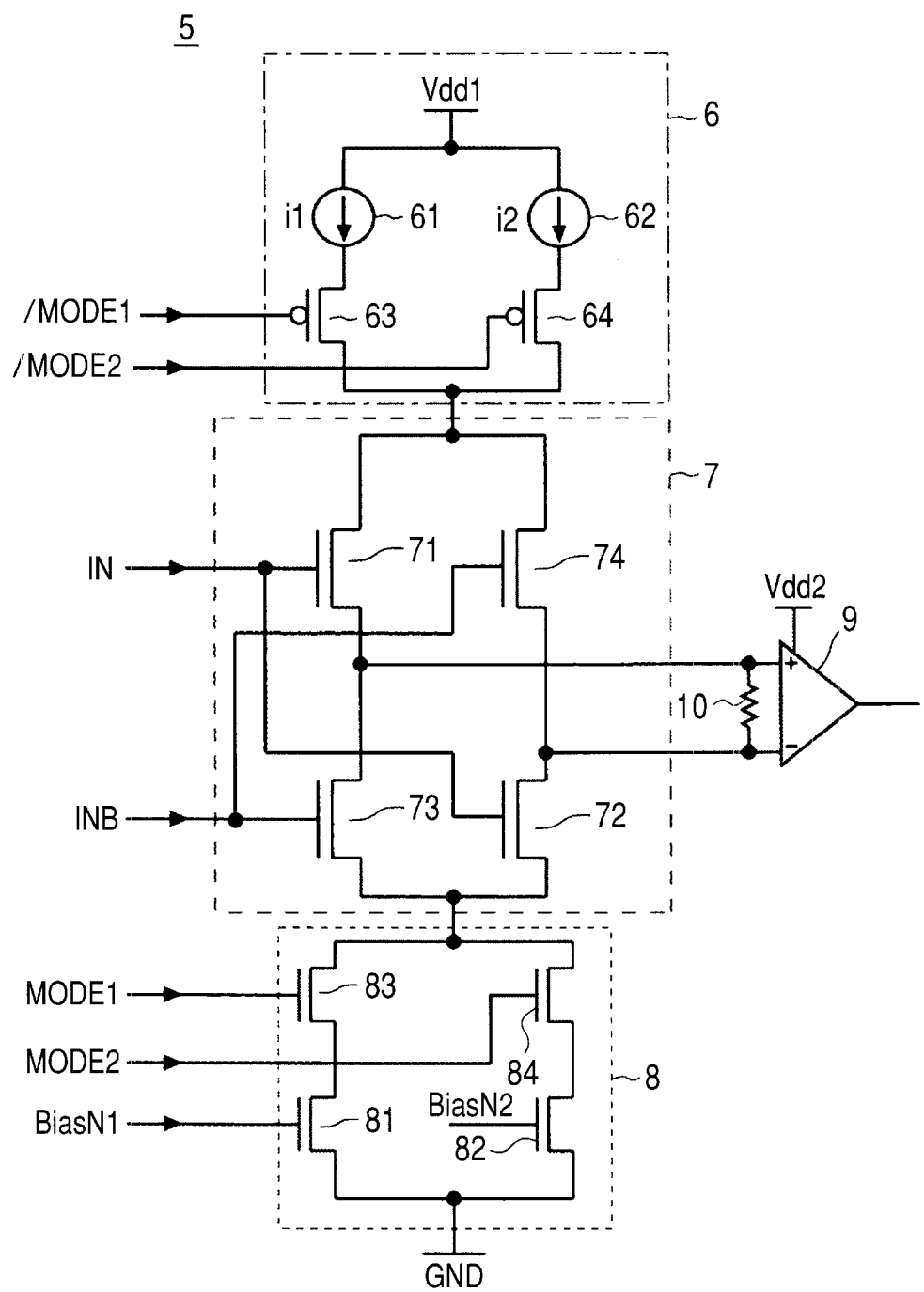
FIG. 2 is a circuit diagram of an LVDS interface in the preferred embodiment 1 of the present invention.

The following describes in detail the LVDS interface 5 according to the present preferred embodiment. FIG. 2 shows a circuit diagram of the LVDS interface 5 in the present preferred embodiment. The LVDS interface 5 shown in FIG. 2 comprises a current value changeover circuit 6 for selecting a constant current i1 or i2 (i1>i2), a transfer circuit 7 for transferring digital signals as differential output signals to the external image processing circuit block, and an offset voltage holding circuit 8 for maintaining a constant offset voltage level for differential output signaling.

The current value changeover circuit 6 shown in FIG. 2 is provided with a current source 61 for supplying the constant current i1, a current source 62 for supplying the constant current i2, a control element 63 for controlling the flow of the constant current i1 supplied from the current source 61 in response to a /MODE1 signal (e.g., switch PMOS), and a control element 64 for controlling the flow of the constant current i2 supplied from the current source 62 in response to a /MODE2 signal (e.g., switch PMOS). The constant current i1 is applied in a high-speed operation mode in which data is transferred at high speed, and the constant current i2 is applied in a low-speed operation mode in which data is transferred at low speed for reduction in power consumption. The operations of the current value changeover circuit 6 are carried out as follows: In the high-speed operation mode, the /MODE1 signal is asserted to "Low" logic level to open the control element 63 so that the constant current i1 is fed to the transfer circuit 7. Alternatively, in the low-speed operation mode, the /MODE2 signal is asserted to "Low" logic level to open the control element 64 so that the constant current i2 is fed to the transfer circuit 7.

The transfer circuit 7 is provided with a pair of active elements 71 and 72 for gating input operation to receive an input signal IN that is a digital signal converted by the column ADC 2, and a pair of active elements 73 and 74 for gating input operation to receive an inverted input signal INB that is formed by inverting the input signal IN. Using the input signal IN and the inverted input signal INB, the transfer circuit 7 delivers a differential output signal to a receiver 9 in the external image processing circuit block. In the present preferred embodiment, a power supply voltage Vdd1 is applied to the LVDS interface 5, and a power supply voltage Vdd2 is applied to the receiver 9.

Figure 3A:
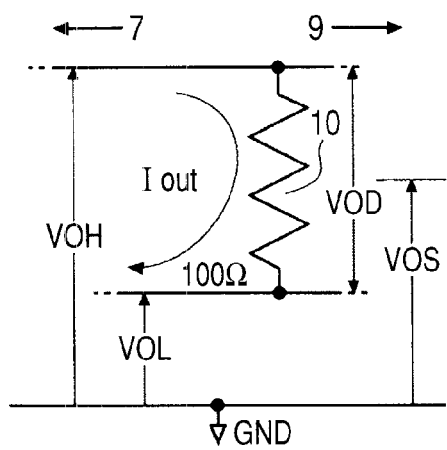
FIGS. 3(a) to 3(c) are explanatory diagrams of LVDS interface operations in the preferred embodiment 1 of the present invention.
Figure 3B:
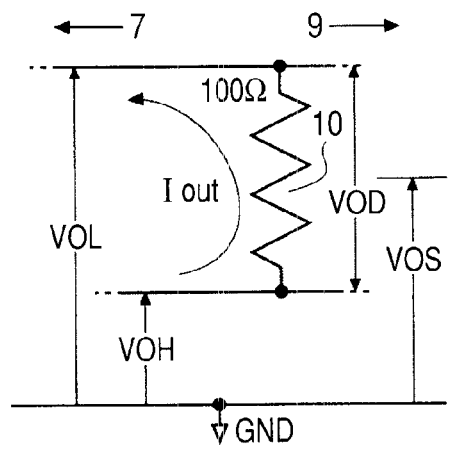
Figure 3C:
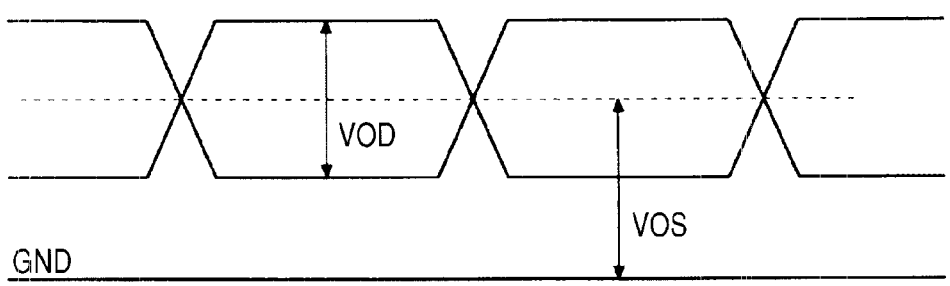

The differential output signal delivered from the transfer circuit 7 is described below in further detail. FIG. 3(a) shows a voltage circuit scheme in which a current Iout is fed downward through a resistor 10 (e.g., 100Ω) located in the vicinity of the receiver 9, and FIG. 3(b) shows a voltage circuit scheme in which the current Iout is fed upward through the resistor 10. In the voltage circuit scheme shown in FIG. 3(a), VOH indicates a voltage to be applied between a GND line and an upper-side line coupled to the resistor 10, VOL indicates a voltage to be applied between the GND line and a lower-side line coupled to the resistor 10, VOD indicates a difference between these voltages VOH and VOL, and VOS indicates a voltage corresponding to the sum of the center levels of the voltages VOH and VOL. In the voltage circuit scheme shown in FIG. 3(b), VOL indicates a voltage to be applied between the GND line and the upper-side line, and VOH indicates a voltage to be applied between the GND line and the lower-side line, while the other conditions are the same as those in FIG. 3(a). A differential output signal waveform produced in the voltage circuit schemes shown in FIGS. 3(a) and 3(b) is presented in FIG. 3(c). In FIG. 3(c), VOD indicates an amplitude of the differential output signal, and VOS indicates an offset voltage for the differential output signal.

In a changeover to be performed between the high-speed operation mode and the low-speed operation mode in the LVDS interface 5 according to the present preferred embodiment as mentioned above, a significant degree of variation in the VOS voltage (offset voltage) is undesirable for the receiver 9. To prevent this undesirable condition, the offset voltage holding circuit 8 is included in the LVDS interface 5 according to the present preferred embodiment.

In the offset voltage holding circuit 8, a bias voltage BiasN1 is applied to a gate terminal NMOS 81 so that the VOS voltage (offset voltage) is adjusted to a level optimal for the receiver 9 when the constant current i1 is fed to the transfer circuit 7. Alternatively, in the offset voltage holding circuit 8, a bias voltage BiasN2 is applied to a gate terminal NMOS 82 so that the VOS voltage (offset voltage) is adjusted to a level optimal for the receiver 9 when the constant current i2 is fed to the transfer circuit 7. That is to say, the offset voltage holding circuit 8 maintains the VOS voltage (offset voltage) at a substantially constant level to prevent a significant degree of variation therein even when a changeover is performed between the high-speed operation mode and the low-speed operation mode.

Further, the offset voltage holding circuit 8 is provided with a control element 83 for control operation by a MODE1 signal and a control element 84 for control operation by a MODE2 signal. Through use of these control elements 83 and 84, a changeover is made between the bias voltages BiasN1 and BiasN2 in VOS voltage (offset voltage) level setting. It is to be noted that the BiasN1 and BiasN2 are tunable bias voltages, and in each operation mode, the VOS voltage (offset voltage) is adjusted to a level optimal for the receiver 9 by using each of these tunable bias voltages.

In the high-speed operation mode, the operations of the offset voltage holding circuit 8 are carried out as follows: The MODE1 signal is asserted to "High" logic level to enable the gate terminal NMOS 81 for the transfer circuit 7 (more specifically, a differential transmission line coupled to the receiver 9), and the VOS voltage (offset voltage) is adjusted according to the bias voltage BiasN1. Alternatively, in the low-speed operation mode, the operations of the offset voltage holding circuit 8 are carried out as follows: The MODE2 signal is asserted to "High" logic level to enable the gate terminal NMOS 82 for the transfer circuit 7 (more specifically, the differential transmission line coupled to the receiver 9), and the VOS voltage (offset voltage) is adjusted according the bias voltage BiasN2. In this manner, the LVDS interface 5 in the present preferred embodiment can maintain the VOS voltage at a substantially constant level in both the high-speed operation mode and the low-speed operation mode.

Modified Form of Preferred Embodiment 1

Figure 4:
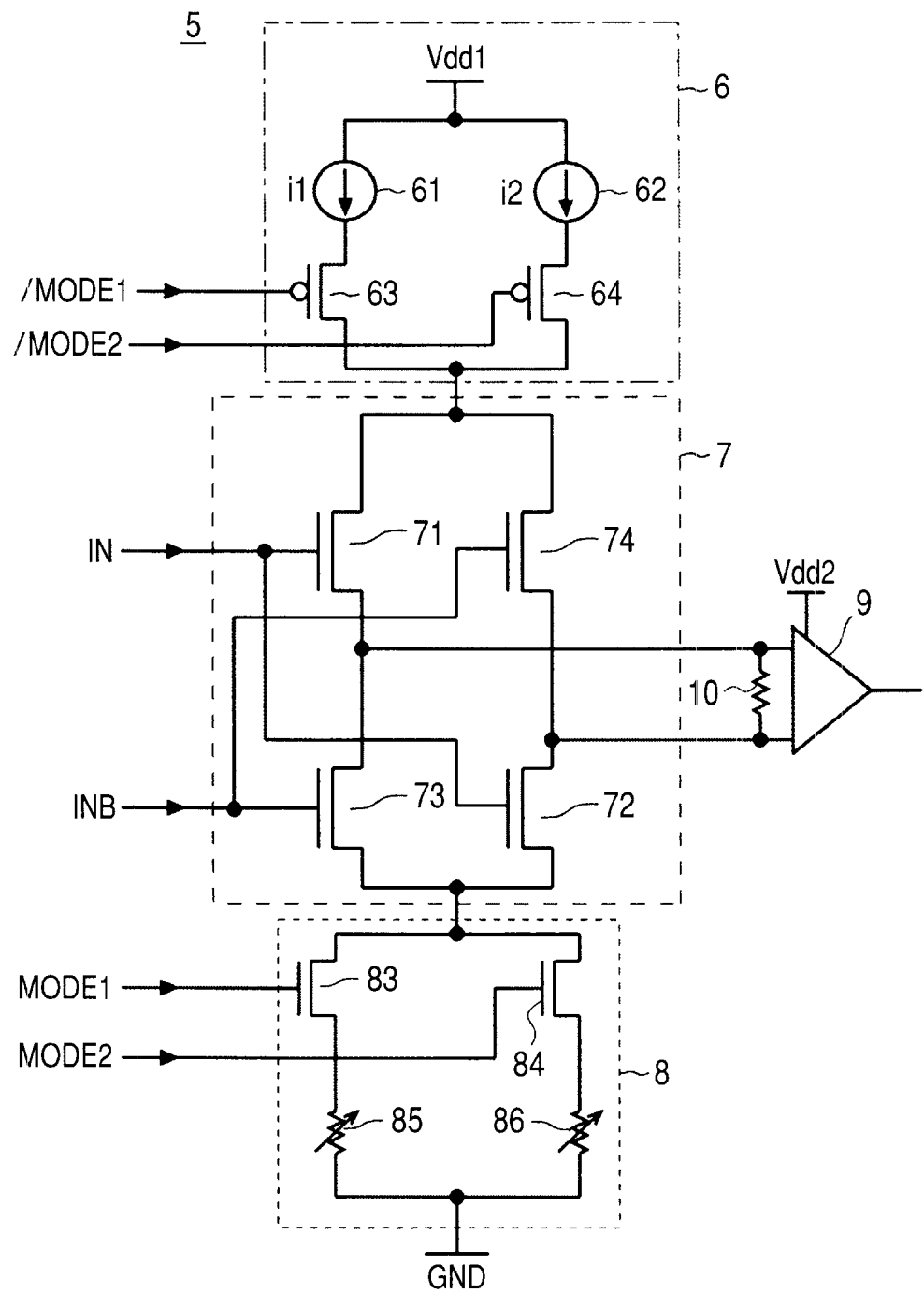
FIG. 4 is a circuit diagram of a modified form of the LVDS interface in the preferred embodiment 1 of the present invention.

Referring to FIG. 4, there is shown a circuit diagram of a modified form of the LVDS interface 5 according to the preferred embodiment 1. The modified form of the LVDS interface 5 shown in FIG. 4 is basically the same as the configuration of the LVDS interface 5 shown in FIG. 2 except the arrangement of the offset voltage holding circuit 8. Therefore, in the circuit diagram of the modified form of the LVDS interface 5 shown in FIG. 4, like parts corresponding to those of the circuit diagram shown in FIG. 2 are assigned like reference numerals. Regarding the like parts corresponding to those shown in FIG. 2, no duplicate detailed description is given below.

The offset voltage holding circuit 8 shown in FIG. 4 is provided with a variable resistor element 85 of a programmable type in place of the gate terminal NMOS 81 that is used to apply a bias voltage BiasN1 for gating operation in the circuit shown in FIG. 2. Through use of the variable resistor element 85, the VOS voltage (offset voltage) is adjusted to a level optimal for the receiver 9 when the constant current i1 is fed to the transfer circuit 7. Likewise, the offset voltage holding circuit 8 shown in FIG. 4 is also provided with a variable resistor element 86 of a programmable type in place of the gate terminal NMOS 82 that is used to apply a bias voltage BiasN2 for gating operation in the circuit shown in FIG. 2. Through use of the variable resistor element 86, the VOS voltage (offset voltage) is adjusted to a level optimal for the receiver 9 when the constant current i2 is fed to the transfer circuit 7.

In the manner mentioned above, the modified form of the LVDS interface 5 according to the preferred embodiment 1 can maintain the VOS voltage at a substantially constant level in both the high-speed operation mode and the low-speed operation mode.

It is to be noted that exemplary circuit configurations of the LVDS interface 5 are shown in FIGS. 2 and 4. The LVDS interface 5 according to the present invention is not limited to the embodiments of these exemplary circuit configurations, and the LVDS interface 5 may have any functionally equivalent circuit configuration.

Preferred Embodiment 2

In the solid-state image sensor device shown in FIG. 1, the LVDS interface 5 coupled to the column ADC 2 for analog-to-digital conversion of signals from the CMOS image sensing circuit comprises a plurality of interface circuits to provide a multi-channel configuration. This arrangement is made since digital signaling of massive multi-bit data is required to meet increased gradation levels represented by digital signals (pixel signals) output from the column ADC 2.

However, in cases where a plurality of LVDS interface circuits 5 are provided as shown in FIG. 1, variations in an output current from each LVDS interface circuit 5 tend to increase due to a larger area required for provision thereof.

Figure 5:
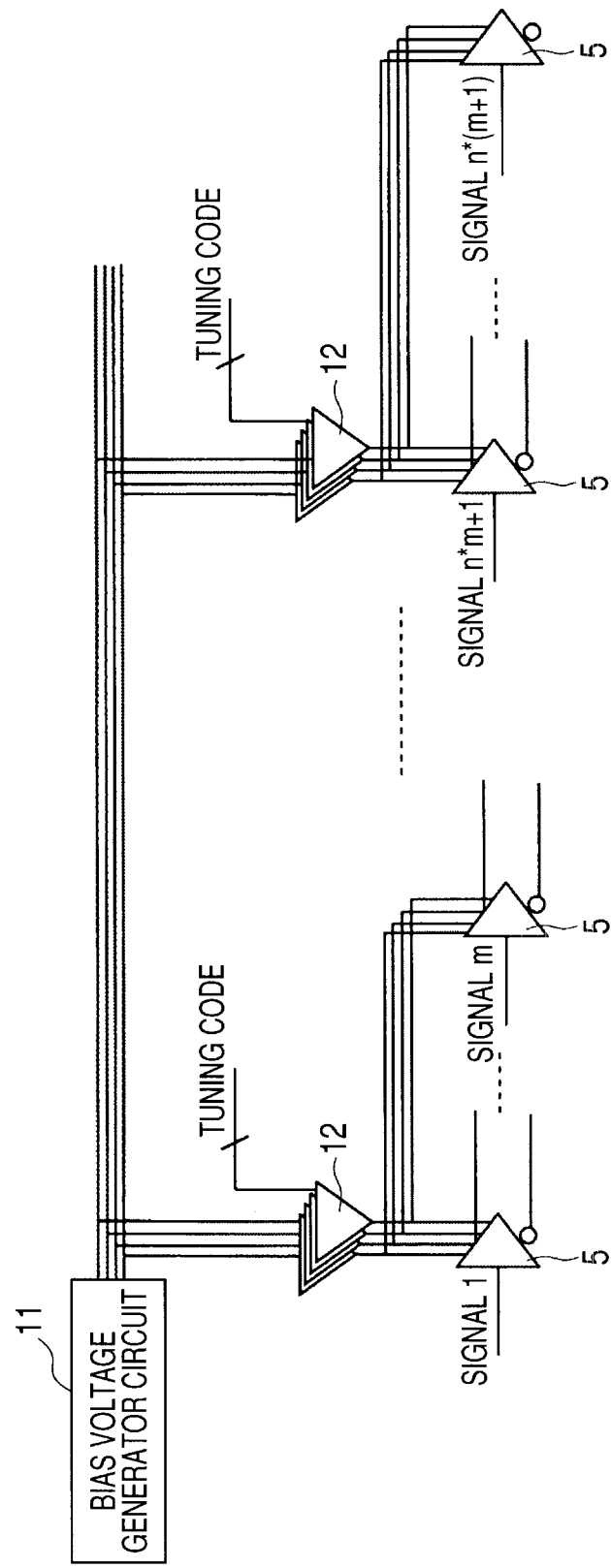
FIG. 5 is a circuit diagram of an LVDS interface in a preferred embodiment 2 of the present invention.

To obviate this disadvantage, in the solid-state image sensor device according to the present preferred embodiment, a plurality of LVDS interface circuits 5 corresponding to a plurality of channels are arranged into groups as shown in FIG. 5. For each group of LVDS interface circuits 5, a bias voltage to be applied thereto is adjusted. The grouping of LVDS interface circuits 5 is made on a criterial basis such as m-channel units.

More specifically, an analog buffer 12 provided for each LVDS interface circuit 5 is tuned in each group of LVDS interface circuits 5 to adjust a bias voltage supplied from a bias voltage generator circuit 11. The bias voltage thus adjusted is fed to each LVDS interface circuit 5. A tuning code for each group is supplied to the analog buffer 12, and according to the tuning code, the bias voltage supplied from the bias voltage generator circuit 11 is adjusted. For the purpose of biasing, either a voltage signal or a voltage signal converted from a current signal through analog buffer operation may be used.

In the solid-state image sensor device according to the present preferred embodiment, the bias voltage is adjusted for each group of LVDS interface circuits 5 as shown in FIG. 5, thereby making it possible to suppress variations in an output current from each LVDS interface circuit 5. It is to be noted that the configuration of the solid-state image sensor device according to the present preferred embodiment is basically the same as that in FIG. 1 except the LVDS interface 5 shown in FIG. 5.

While the solid-state image sensor device according to the present preferred embodiment has been described as an arrangement in which the LVDS interface 5 is provided for external signal transfer interfacing as shown in FIG. 5, the present invention is not limited thereto and any differential interface controllable by a bias voltage may be used in lieu of the LVDS interface 5 shown in FIG. 5.

Figure 6:
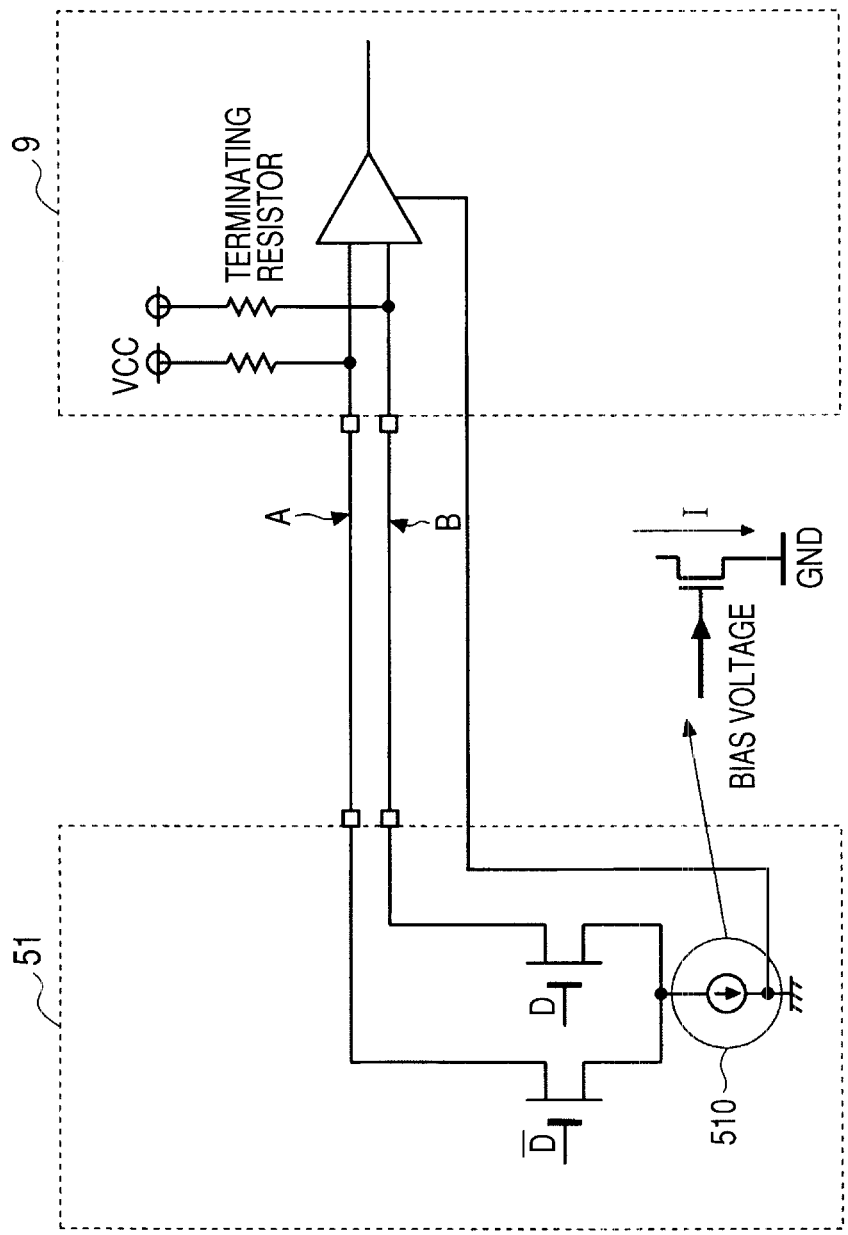
FIG. 6 is a circuit diagram of another kind of differential interface in the preferred embodiment 2 of the present invention.
Figure 7:
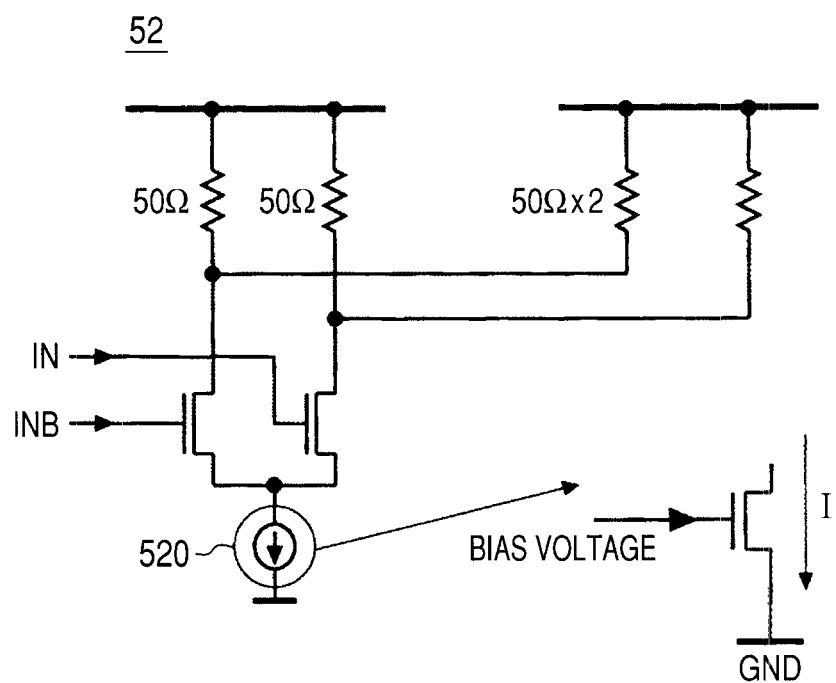
FIG. 7 is a circuit diagram of another kind of differential interface in the preferred embodiment 2 of the present invention.

To be more specific, instead of the LVDS interface 5 shown in FIG. 5, a TMDS (Transition Minimized Differential Signaling) interface 51 shown in FIG. 6 may be used. The TMDS interface 51 shown in FIG. 6 is another kind of differential interface that controls a constant current source 510 by means of a bias voltage. Likewise, instead of the LVDS interface 5 shown in FIG. 5, a CML (Current Mode Logic) interface 52 shown in FIG. 7 may also be used. The CML interface 52 shown in FIG. 7 is another kind of differential interface that controls a constant current source 520 by means of a bias voltage.

Preferred Embodiment 3

Figure 8:
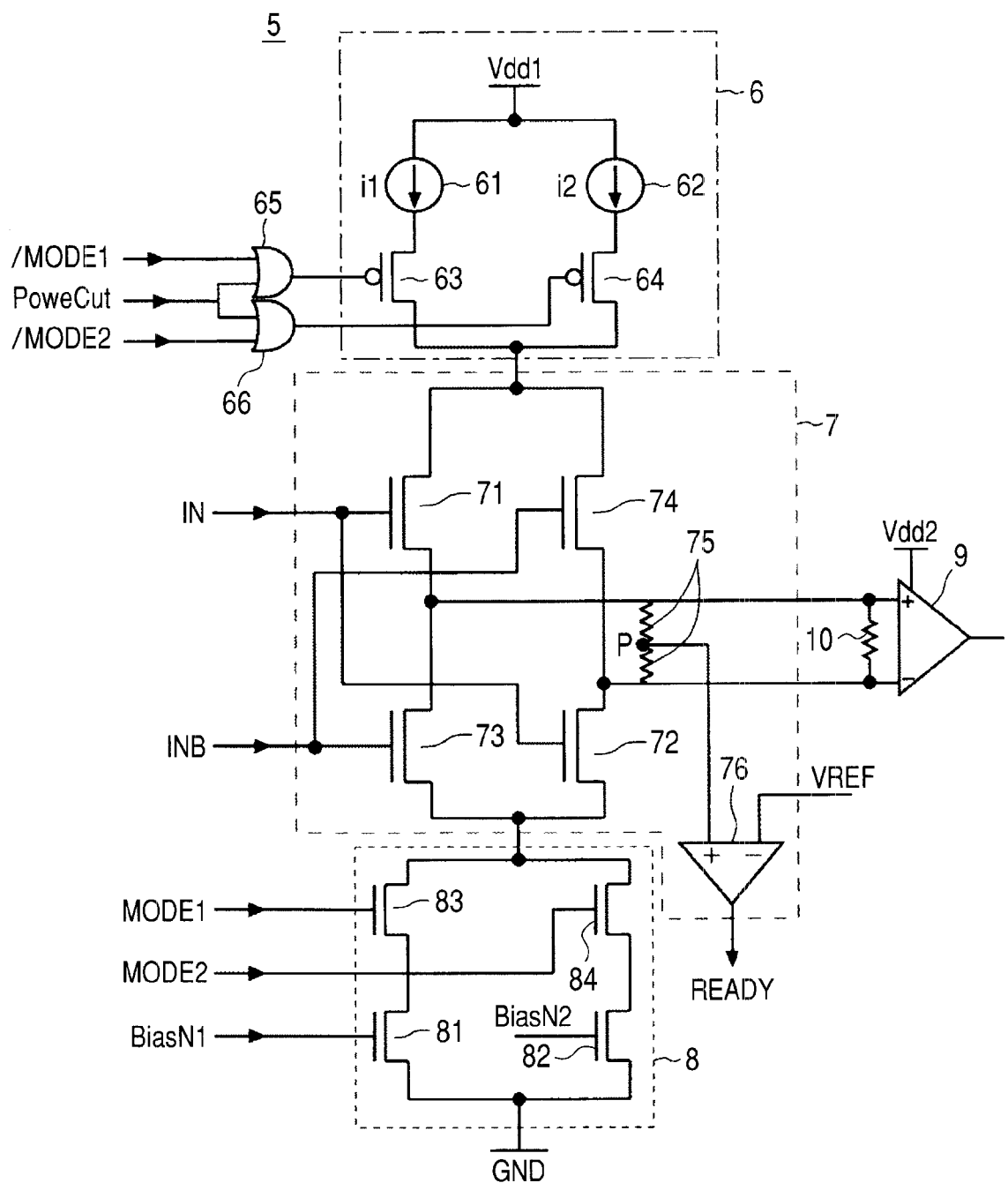
FIG. 8 is a circuit diagram of an LVDS interface in a preferred embodiment 3 of the present invention.

Referring to FIG. 8, there is shown a circuit diagram of an LVDS interface 5 according to a preferred embodiment 3 of the present invention. The configuration of the LVDS interface shown in FIG. 5 is basically the same as that shown in FIG. 2 except the arrangements of the current value changeover circuit 6 and the transfer circuit 7. Therefore, in the circuit diagram of the LVDS interface 5 shown in FIG. 8, like parts corresponding to those of the circuit diagram shown in FIG. 2 are assigned like reference numerals. Regarding the like parts corresponding to those shown in FIG. 2, no duplicate detailed description is given below. It should also be noted that the configuration of the solid-state image sensor device according to the present preferred embodiment is the same as that shown in FIG. 1 except the LVDS interface 5 shown in FIG. 8.

In the current value changeover circuit 6 shown in FIG. 8, OR circuits 65 and 66 are arranged respectively at a gate of the control element 63 for controlling the flow of the constant current i1 supplied from the current source 61 and at a gate of the control element 64 for controlling the flow of the constant current i2 supplied from the current source 62. The /MODE1, /MODE2, and PowerCut signals are input to the current value changeover circuit 6 through the OR circuits 65 and 66. That is to say, a power-cutoff operation mode is additionally provided in the current value changeover circuit shown in FIG. 8. When the PowerCut signal is input, the control elements 63 and 64 are operated to shut off the current sources 61 and 62 from the transfer circuit 7.

Further, the transfer circuit 7 shown in FIG. 8 is provided with a transmission monitor circuit which extracts an intermediate potential P from a high-resistance element 75 on the differential transmission line coupled to the receiver 9, and inputs the intermediate potential P thus extracted to a comparator 76. In the comparator 76, the intermediate potential P is compared with a predetermined reference voltage VREF, and a READY signal is output therefrom in accordance with the result of comparison.

The LVDS interface 5 shown in FIG. 8 is therefore capable of providing a standby mode in which power consumption is reduced substantially. To be more specific, in the LVDS interface 5 shown in FIG. 8, when the PowerCut signal is asserted, the control elements 63 and 64 are operated to completely cut off current paths from the power sources 61 and 62, and the voltage level of the differential transmission line coupled to the receiver 9 is fixed at 0 V by means of a current path that extends from the differential transmission line to the GND line through the active elements 72 and 73 and the offset voltage holding circuit 8.

Alternatively, when the LVDS interface 5 shown in FIG. 8 is released from the standby mode, the /MODE1 or /MODE2 signal is asserted to "Low" logic level while the MODE1 or MODE2 signal is asserted to "High" logic level. Then, in the LVDS interface 5 shown in FIG. 8, a current is fed to the differential transmission line. However, at the moment immediately after the LVDS interface 5 shown in FIG. 8 is released from the standby mode, a predetermined potential level is not yet reached on the differential transmission line, thereby disallowing LVDS operation. For LVDS operation in the LVDS interface 5 shown in FIG. 8, the intermediate potential P on the differential transmission line is extracted from the high-resistance element 75 thereof, and the intermediate potential P thus extracted is monitored by the comparator 76. When it is found that the intermediate potential P has reached the predetermined reference voltage VREF, a READY signal is asserted to notify a system circuit that the LVDS interface 5 is ready for LVDS operation.

As mentioned above, in the solid-state image sensor device according to the present preferred embodiment, the PowerCut signal is input to the LVDS interface 5, and the intermediate potential P on the differential transmission line is monitored, thereby making it possible to provide the standby mode in which power consumption is reduced substantially.

Preferred Embodiment 4

In a case where the LVDS interface 5 is formed on a semiconductor chip as shown in FIG. 9(*a*), it is required to provide I/O (input/output) areas 15 for pads to be coupled to the receiver 9, EDS, etc. In laying out the LVDS interface 5 and the I/O areas 15 on a highly integrated semiconductor chip represented by an SoC (System On a Chip), an arrangement such as shown in FIG. 9(*b*) must be made because of requirement for a narrow space between the I/O areas 15 located at mutually adjacent positions.

However, in the solid-state image sensor device according to the present preferred embodiment or a full-size CMOS image sensor to be mounted on such an apparatus as a single-lens reflex digital camera, the number of pad terminals is rather small relatively to the chip size thereof. On this account, in a majority of applications of the solid-state image sensor device according to the present preferred embodiment, it is possible to provide a larger pad-to-pad topological interval than in conventional SoC arrangements, thereby allowing a wider space between the adjacent I/O areas 15.

Therefore, in the solid-state image sensor device according to present preferred embodiment, the LVDS interface 5 (illustrated as LVDS core 5) can be arranged on a space between the adjacent I/O areas 15 as exemplified in layout topologies shown in FIGS. 9(*c*) and 9(*d*). Thus, the height of the I/O areas 15 as well as that of the LVDS interface 5 can be decreased.

More specifically, in the layout topology shown in FIG. 9(c) where a larger pad-to-pad topological interval is available, the I/O areas 15 are arranged in the horizontal direction unlike the arrangement shown in FIG. 9(b). While the height of the I/O areas 15 in FIG. 9(b) is H1, the height of the I/O areas 15 in FIG. 9(c) is W1/2 (<H1).

Further, since a space larger than double the dimension H1 is provided in pad-to-pad arrangement shown in FIG. 9(c), the LVDS interface 5 is arranged using the space between the adjacent I/O areas 15 also. Thus, the height of the LVDS interface 5 in FIG. 9(c) can be decreased to less than W1/2. While the height of the I/O areas 15 including that of the LVDS interface 5 in FIG. 9(b) is H1+H2, the corresponding height in FIG. 9(c) can be decreased to less than W1 (<H1+H2).

Further, in the layout topology shown in FIG. 9(d) where a larger pad-to-pad topological interval is also available, the LVDS interface 5 is arranged on a space between the adjacent I/O areas 15. That is, since a space larger than double the dimension W1 is provided in pad-to-pad arrangement shown in FIG. 9(d), the LVDS interface 5 is arranged on the space between the adjacent I/O areas 15. Thus, the height of the I/O areas 15 including that of the LVDS interface 5 in FIG. 9(d) can be decreased to H1.

It is to be noted that the solid-state image sensor device according to the present preferred embodiment is formed on a semiconductor chip including the circuits shown in FIG. 1 as well as the LVDS interface 5 and the I/O areas 15 described with reference to FIGS. 9(c) and 9(d). Further, while the LVDS interface 5 in the solid-state image sensor device according to the present preferred embodiment has been described as an interface for external signal transfer, the present invention is not limited thereto and any differential interface controllable by a bias voltage may be used in lieu of the LVDS interface 5. To be more specific, instead of the LVDS interface 5, the TMDS interface or the CML interface described in the preferred embodiment 2 may be used.

Preferred Embodiment 5

Figure 10A:
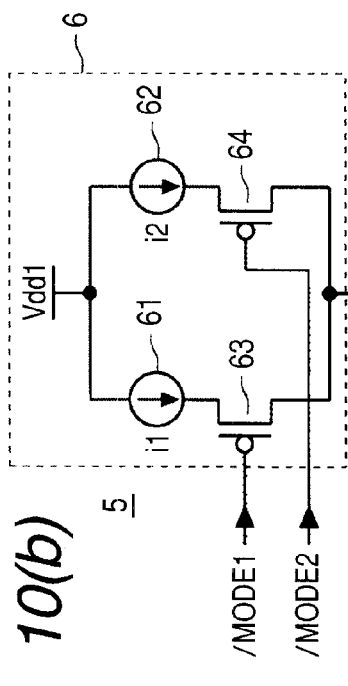
FIGS. 10(a) and 10(b) are circuit diagrams of an LVDS interface in a preferred embodiment 5 of the present invention.
Figure 10B:
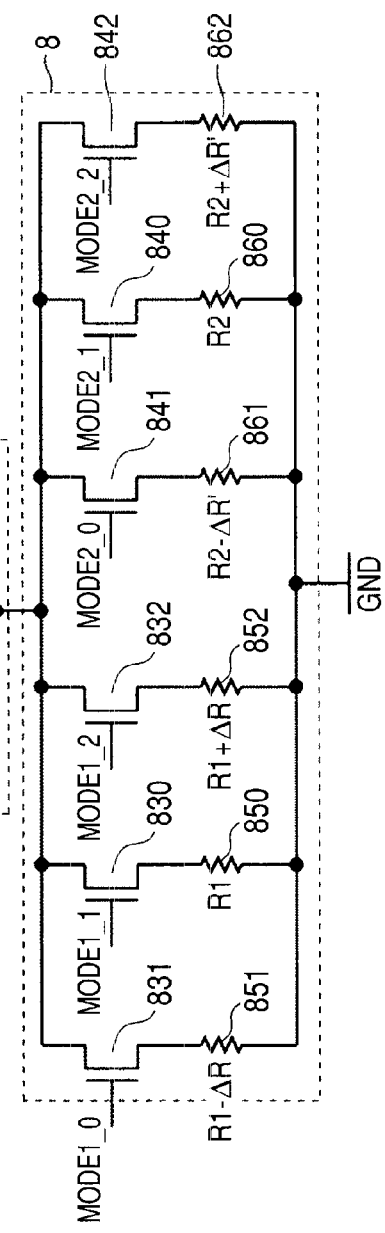

Referring to FIGS. 10(a) and 10(b), there are shown circuits of an LVDS interface 5 according to a preferred embodiment 5. The configuration of the LVDS interface 5 shown in FIG. 10(b) is basically the same as that shown in FIG. 4 except the arrangement of the offset voltage holding circuit 8. Therefore, in the circuit diagram of the LVDS interface 5 shown in FIG. 10(b), like parts corresponding to those of the circuit diagram shown in FIG. 4 are assigned like reference numerals. Regarding the like parts corresponding to those shown in FIG. 4, no duplicate detailed description is given below. It should also be noted that the configuration of the solid-state image sensor device according to the present preferred embodiment is the same as that shown in FIG. 1 except the LVDS interface 5 shown in FIGS. 10(a) and 10(b).

In the LVDS interface 5 according to present preferred embodiment, the offset voltage holding circuit 8 thereof shown in FIG. 10(b) has a configuration different from that of the offset voltage holding circuit shown in FIG. 4. As shown in FIG. 10(b), the offset voltage holding circuit 8 in the present preferred embodiment is capable of selecting any of a plurality of resistor elements in accordance with each operation mode. For this selection, as shown in FIG. 10(a), there is provided a circuit configuration (AND circuit configuration) which generates MODE1-related signals (MODE1_0, MODE1_1, MODE1_2) and MODE2-related signals (MODE2_0, MODE2_1, MODE2_2) through combinations of operation mode signals (MODE1 signal, MODE2 signal) and tuning codes (P0, P1, P2). This AND circuit configuration is arranged at a preceding stage of the offset voltage holding circuit 8 shown in FIG. 10(b).

In response to a signal output from the AND circuit configuration shown in FIG. 10(a), the offset voltage holding circuit 8 shown in FIG. 10(b) performs a changeover of the resistor elements to maintain a constant offset voltage level for differential output signaling.

In the offset voltage holding circuit 8 shown in FIG. 10(b), when the MODE1_1 signal is input to a gate terminal NMOS 830, a resistor element 850 having a resistance value of R1 is selected to adjust the VOS voltage (offset voltage) to a level optimal for the receiver 9 when the constant current i1 is fed to the transfer circuit 7. However, if a VOS level optimal for the receiver 9 cannot be attained by selecting the resistor element 850 having the resistance value of R1, the MODE1_0 signal corresponding to the tuning code P0 is input to a gate terminal NMOS 831 to select a resistor element 851 having a resistance value of R1-$\Delta$R. Thus, as compared with the case that the resistor element 850 having the resistance value of R1 is selected, the VOS level can be decreased by a variation value of $\Delta R*i1$. Alternatively, when the MODE1_2 signal corresponding to the tuning code P2 is input to a gate terminal NMOS 832, a resistor element 852 having a resistance value of R1+$\Delta$R is selected. Thus, as compared with the case that the resistor element 850 having the resistance value of R1 is selected, the VOS level can be increased by a variation value of $\Delta R*i1$. It is to be noted that the variation value of $\Delta R*i1$ in VOS level adjustment represents the amount of change in the VOS voltage (offset voltage) to be applied to the receiver 9 when the constant current i1 is fed to the transfer circuit 7 in case of a change in resistance $\Delta$R of the offset voltage holding circuit $\theta$.

Likewise, in the offset voltage holding circuit 8 shown in FIG. 10(b), when the MODE2_1 signal is input to a gate terminal NMOS 840, a resistor element 860 having a resistance value of R2 is selected to adjust the VOS voltage (offset voltage) to a level optimal for the receiver 9 when the constant current i2 is fed to the transfer circuit 7. However, if a VOS level optical for the receiver 9 cannot be attained by selecting the resistor element 860 having the resistance value of R2, the MODE2_0 signal corresponding to the tuning code P0 is input to a gate terminal NMOS 841 to select a resistor element 861 having a resistance value of R2-$\Delta$R'. Thus, as compared with the case that the resistor element 860 having the resistance value of R2 is selected, the VOS level can be decreased by a variation value of $\Delta R*i2$. Alternatively, when the MODE2_2 signal corresponding to the tuning code P2 is input to a gate terminal NMOS 842, a resistor element 862 having a resistance value of R2+$\Delta$R' is selected. Thus, as compared with the case that the resistor element 860 having the resistance value of R2 is selected, the VOS level can be increased by a variation value of $\Delta R*i2$. It is to be noted that the variation value of $\Delta R*i2$ in VOS level adjustment represents the amount of change in the VOS voltage (offset voltage) to be applied to the receiver 9 when the constant current i2 is fed to the transfer circuit 7 in case of a change in resistance $\Delta$R' of the offset voltage holding circuit $\theta$.

As mentioned above, in the offset voltage holding circuit $\theta$ according to the present preferred embodiment, even when a changeover is performed between the high-speed operation mode and the low-speed operation mode, the VOS voltage (offset voltage) can be maintained at a substantially constant level to prevent a significant degree of variation therein, and also the VOS level can be shifted up/down as required in accordance with adjustment setting of the tuning codes (P0, P1, P2). Since the constant current i2 fed to the transfer circuit is not affected when the tuning code (P0, P1, P2) is changed, the VOD remains unchanged even if the VOS level is shifted up/down. Therefore, no adverse effect occurs in the quality of output signaling. In particular, even in a situation where there is a possibility that variations in PVT (process, voltage, temperature) may cause the VOS level to shift up/down to exceed an allowable range on the receiver 9, the LVDS interface 5 according to the present preferred embodiment can keep the VOS level within the allowable range on the receiver 9, thereby enhancing reliability of data transmission.

While the LVDS interface 5 shown in FIGS. 10(a) and 10(b) has been described as an interface having a three-step tuning arrangement, the present invention is not limited thereto and there may be provided such a modified arrangement that two tuning steps or four or more tuning steps are used.

Preferred Embodiment 6

Figure 11A:
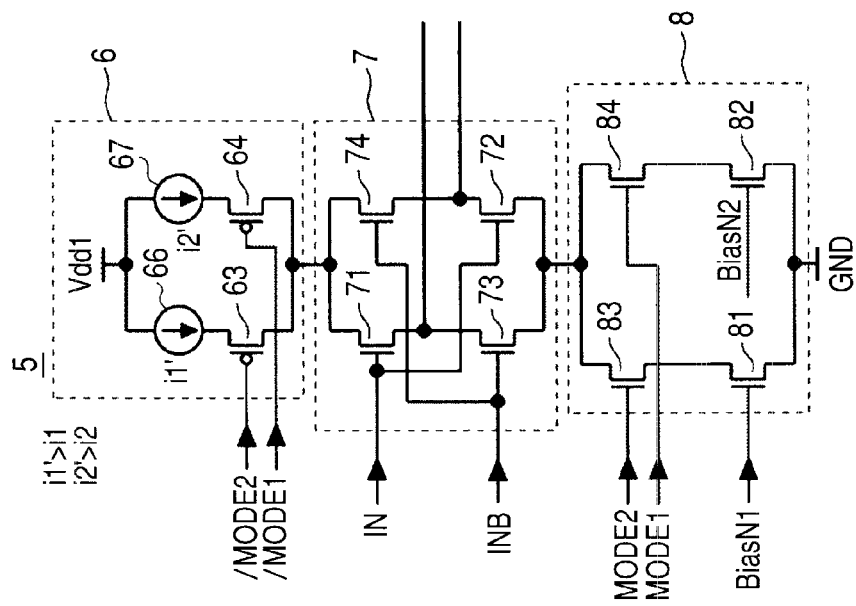
FIGS. 11(a) and 11(b) are circuit diagrams of an LVDS interface in a preferred embodiment 6 of the present invention.
Figure 12:
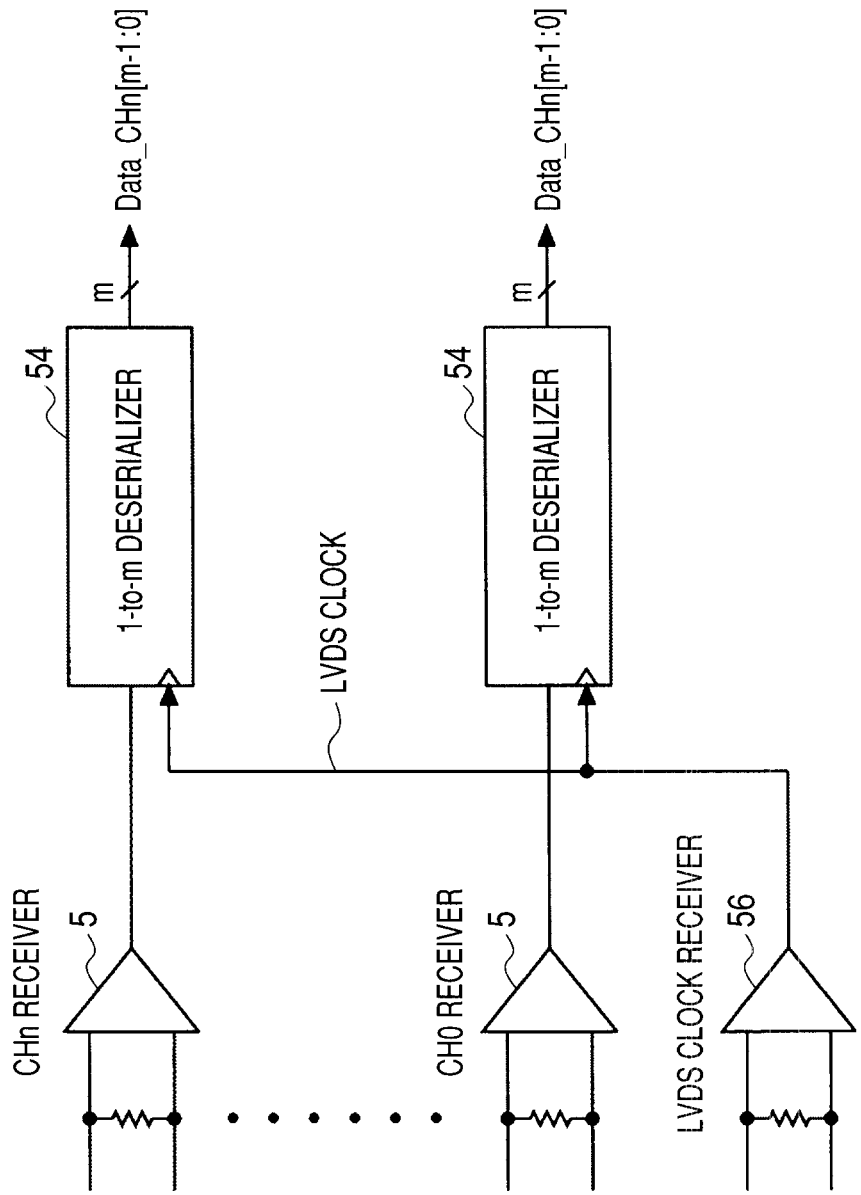
FIG. 12 is a circuit diagram of a receiver-side LVDS interface in the preferred embodiment 6 of the present invention.

Through the LVDS interface 5, digital signal data output from the column ADC 2 shown in FIG. 1 is transferred to the external image processing circuit block. In this digital signal data transfer operation, m-bit parallel data is transferred. For digital signal data transfer through the LVDS interface 5, digital signals output from the column ADC 2 are converted into m-to-1 serial signals by a serializer 51 shown in FIG. 11(a). Thereafter, the serial signals thus formed are fed the LVDS interface 5 via a pre-driver 52. Then, the serial signals are transferred to a receiver-side LVDS interface 5 shown in FIG. 12. Upon receiving the serial signals, the receiver-side LVDS interface 5 converts the serial signals into m-bit parallel data by using a 1-to-m deserializer 54. In FIG. 11(a) and FIG. 12, there are shown "n+1" pairs of LVDS interface circuits 5 to be used on the transfer side and receiver side (channel "0" designated as CH0—channel "n" designated as CHn).

In the serializer 51 allocated for each channel, m-bit parallel data (DIN_CH0 [m−1:0] to DIN_CHn [m−1:0]) is latched with a low-speed clock signal CLK, and in synchronization with a high-speed clock signal CLK×m having a rate of "multiplication by m", serial data formed through conversion is transferred to the LVDS interface 5 in succession. At the receiver-side LVDS interface 5, the serial data is received on each channel and then fed to the deserializer 54.

As shown in FIG. 11(a), the transfer-side LVDS interface 5 is provided with an interface 50 for high-speed LVDS clock signaling to the receiver side in addition to channels for transferring m-bit parallel data (DIN_CH0 [m−1:0] to DIN_CHn [m−1:0]) through serialization. To the interface 50, the high-speed clock signal CLK×m having a rate of "multiplication by m" is input via a dummy buffer 53 corresponding to the serializer 51 and a pre-driver 52 coupled thereto. Then, the interface 50 transfers the input high-speed clock signal CLK×m as an LVDS clock signal to an LVDS clock receiver 56 on the receiver side. Upon receiving the LVDS clock signal, the LVDS clock receiver 56 on the receiver side supplies the LVDS clock signal to the deserializer 54 allocated for each channel. In accordance with the LVDS clock signal thus supplied, the deserializer 54 converts the received serial data into m-bit parallel data (DIN_CH0 [m−1:0] to DIN_CHn [m−1:0]).

Figure 13:
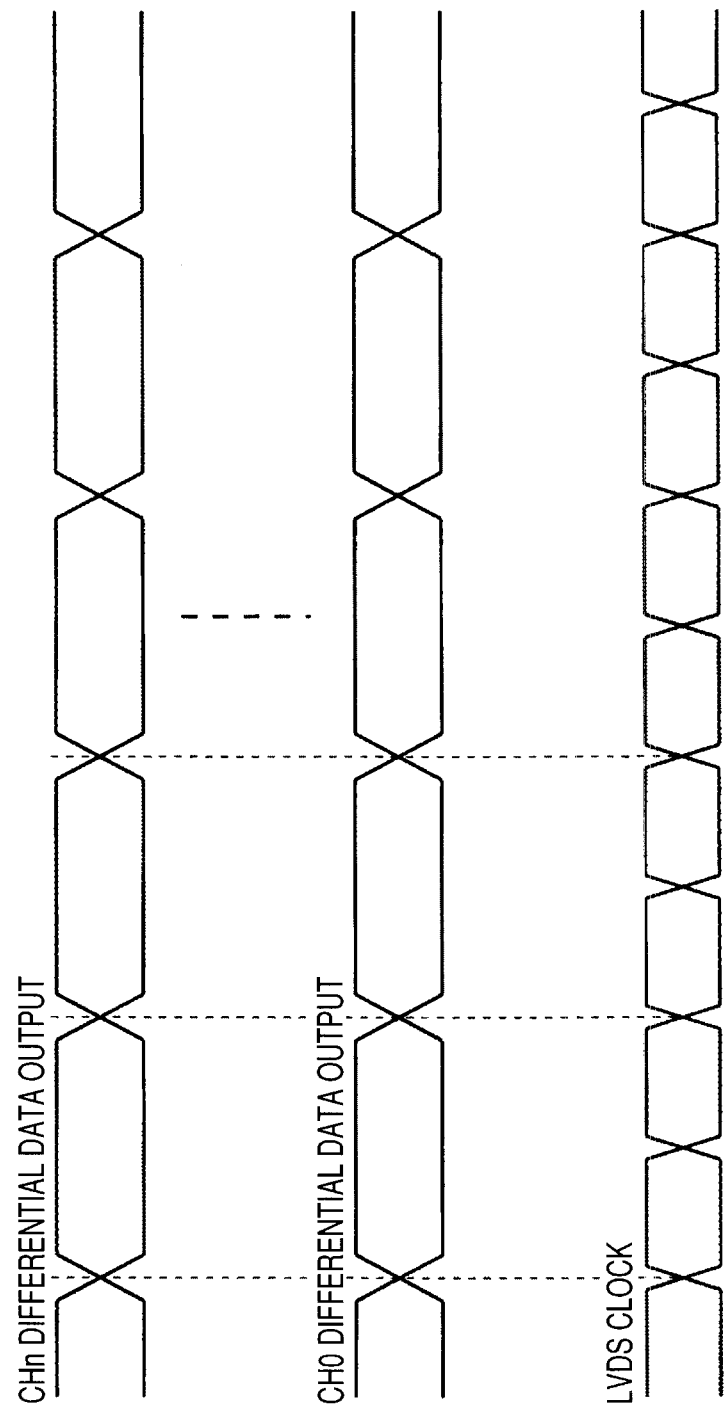
FIG. 13 is an explanatory diagram of a timing sequence for transferring differential data with a clock signal from the LVDS interface in the preferred embodiment 6 of the present invention.

Referring to FIG. 13, there is shown a timing chart of differential data output on each channel with respect to the LVDS clock signal in the data transfer system mentioned above. As can be seen from the timing chart shown in FIG. 13, the transfer speed of the LVDS clock signal should be two times as high as the transfer speed of differential data output.

In general, VOD in differential interface operation tends to decrease as the speed of transfer becomes higher. Therefore, in the differential interface according to the present preferred embodiment, a constant current to the interface 50 used for LVDS clock signal transfer is set at a higher level than that for the interface 5 used for data transfer, thereby obviating a decrease in VOD.

Figure 11B:
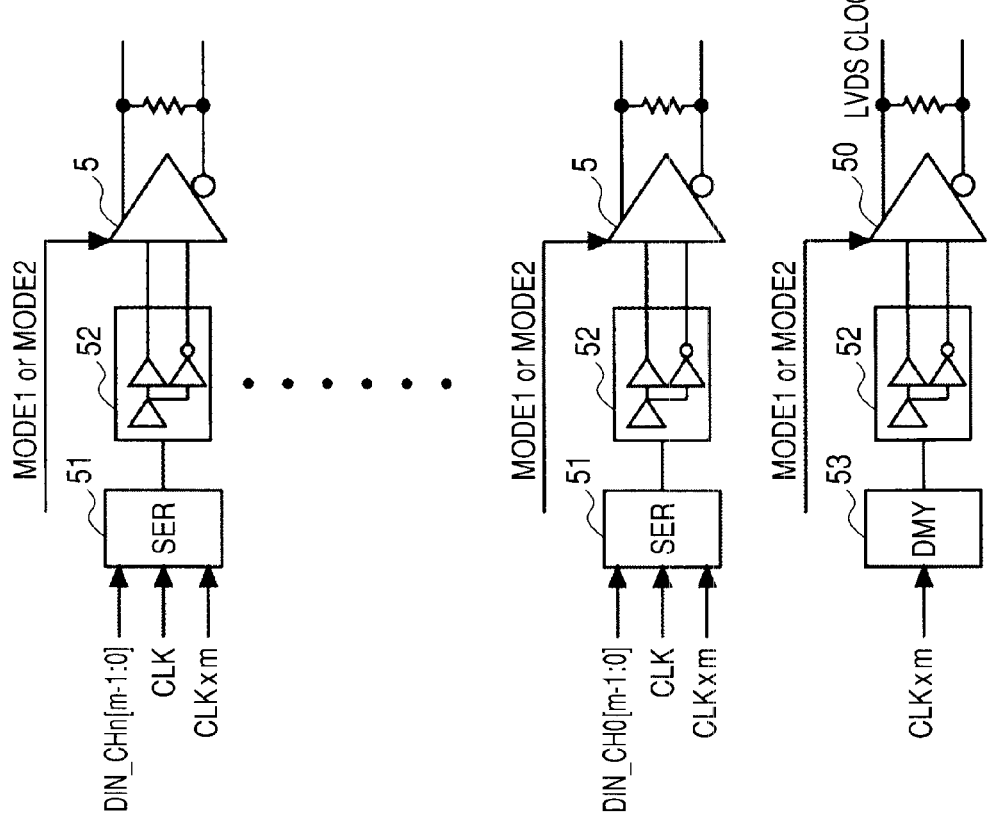

More specifically, as shown in FIG. 11(b), the interface 50 used for LVDS clock transfer is provided with a current value changeover circuit 6 that includes a current source 66 for supplying a constant current i1' (>i1) in lieu of the current source 61 for the constant current i1 and a current source 67 for supplying a constant current i2' in lieu of the current source 62 for the constant current i2. Thus, a transfer circuit 7 in the interface 50 used for LVDS clock signal transfer is supplied with a higher constant current than that to the transfer circuit 7 in the LVDS interface 6 used for data transfer. In the interface 50 shown in FIG. 11(b), like parts corresponding to those of the LVDS interface 5 shown in FIG. 2 are assigned like reference numerals. Regarding the like parts corresponding to those shown in FIG. 2, no duplicate detailed description is given herein.

What is claimed is:

1. A differential interface for transmitting digital signals as differential output signals to an external device, said differential interface comprising:
    a current value setting circuit for setting a constant current to be applied in said differential interface in accordance with each of a plurality of operation modes; and
    an offset voltage holding circuit for maintaining an offset voltage at a predetermined level for said differential output signals in said each of a plurality of operation modes.

2. The differential interface according to claim 1,
    wherein said current value setting circuit comprises a plurality of current sources, and
    wherein said offset voltage holding circuit comprises a plurality of MOS transistors each gate of which is biased.

3. The differential interface according to claim 1,
    wherein said current value setting circuit comprises a plurality of current sources, and
    wherein said offset voltage holding circuit comprises a plurality of variable resistor elements.

* * * * *